United States Patent [19]

Maisch et al.

[11] 4,192,279
[45] Mar. 11, 1980

[54] METHOD AND APPARATUS FOR AUTOMATIC ENGINE SHUT-OFF AND RESTART

[75] Inventors: Wolfgang Maisch, Schwieberdingen, Fed. Rep. of Germany; Rainer Burkel, Le Chesnay, France

[73] Assignee: Robert Bosch GmbH, Stuttgart, Fed. Rep. of Germany

[21] Appl. No.: 4,236

[22] Filed: Jan. 17, 1979

[30] Foreign Application Priority Data

Jan. 25, 1978 [DE] Fed. Rep. of Germany ....... 2803145

[51] Int. Cl.² ............................................. F02B 75/12
[52] U.S. Cl. ........................ 123/198 F; 123/198 DC; 123/198 DB; 123/97 B; 123/179 A
[58] Field of Search ..... 123/198 F, 198 DB, 198 DC, 123/97 B, 1 R, 179 A, 179 G

[56] References Cited

U.S. PATENT DOCUMENTS

| 4,022,164 | 5/1977 | Fuchs | 123/198 F |
| 4,040,395 | 8/1977 | Demetrescu | 123/32 EA |
| 4,061,055 | 12/1977 | Lizuba et al. | 123/198 F |
| 4,098,252 | 7/1978 | Abthoff et al. | 123/198 F |

*Primary Examiner*—Ira S. Lazarus
*Attorney, Agent, or Firm*—Edwin E. Greigg

[57] ABSTRACT

A method and apparatus for automatic arrest of the motor in a motor vehicle in conditions of standstill or near-standstill, for example when the motor reaches speeds at or below the stalling speed with an engaged drive line. In stop-and-go driving, the invention includes monitoring the vehicle speed, the motor speed and the state of actuation of the accelerator pedal and the clutch pedal. If a set of conditions is met, for example that the vehicle speed is below 3 kilometers per hour, and that neither the accelerator pedal nor the clutch pedal are depressed, and the engine temperature is sufficiently high, the apparatus of the invention automatically arrests the engine either by fuel shut-off or by ignition shut-off or both. A depression of the clutch pedal restarts the engine. The invention further provides for automatic fuel shut-off to the motor under the conditions of engine braking, i.e., operation with closed throttle and relatively high motor speed.

19 Claims, 8 Drawing Figures

METHOD AND APPARATUS FOR AUTOMATIC ENGINE SHUT-OFF AND RESTART

FIELD OF THE INVENTION

The invention relates to the control of an internal combustion engine under special conditions of operation. More particularly, the invention relates to a method and an apparatus for stopping the operation of the internal combustion engine at very low vehicle speeds, for example in bumper-to-bumper traffic, for the purpose of fuel conservation and reduction of toxic emissions.

BACKGROUND OF THE INVENTION

Known in the art is an apparatus for arresting an internal combustion engine for the purpose of fuel conservation. An inherent disadvantage of the known apparatus is that it causes engine stoppage without consideration of important engine criteria, for example without establishing a minimum speed above which the engine is not stopped and further without considering the charging level of the vehicle battery which is critically important for deciding whether it is prudent to stop the engine inasmuch as it may be difficult or impossible to be restarted. Furthermore, the known apparatus fails to include provisions which prevent repeated engine stoppage at very low vehicle speeds. None of the known apparatus is able to provide for a sensitive adaptation to prevailing conditions of the vehicle and in particular tends to shut off the engine when this is counter to the driver's desires or, again, fails to shut off the engine under conditions where it would be justifiable to do so.

OBJECT AND SUMMARY OF THE INVENTION

It is thus a principal object of the present invention to provide a method and an apparatus for automatic stoppage and restart of a motor vehicle engine which is not subject to the aforementioned disadvantageous characteristics of the previously known methods and apparatus. An associated object is to provide a method and an apparatus which provides fuel conservation which, in combined city and highway use including bumper-to-bumper traffic may reach values of for example 25% when compared with vehicles not equipped with an apparatus according to the invention.

It is an advantageous feature of the invention that the signals needed for performing the engine shut-off and restart operations are derived from sensors which are normally present in modern vehicles. An associated advantage is that the apparatus according to the invention may be retrofitted into operational vehicles. It has also been found that the apparatus and method of the invention result in substantial reductions of toxic and noxious emissions. The repeated stoppage and starting of the engine does not produce any significant disadvantages, the required battery current being easily replenished in modern engines by the almost universally used A.C. generators that are capable of charging the battery even at idle speeds.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
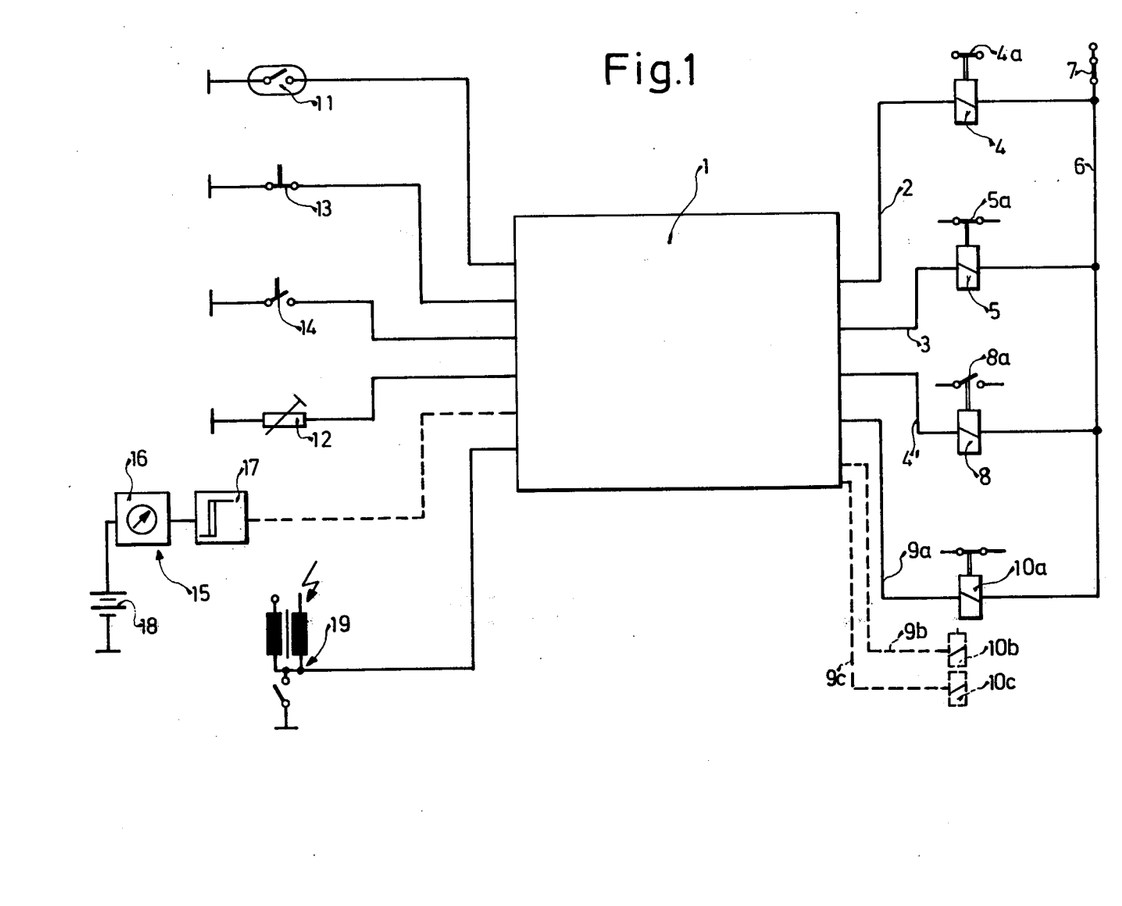
FIG. 1 is an overall block diagram of the apparatus of the invention including an array of sensors and a set of actuating elements.

Turning now to FIG. 1, there will be seen a schematic block diagram of the various peripheral elements used in association with the invention, i.e., sensors or transducers generally disposed on the left side of FIG. 1, for generating operational signals which are fed to an input side of a general controller designated by the numeral 1. The capability of the apparatus of the invention to accept a plurality of sensor signals makes it possible to adapt its operation very sensitively to the various conditions of the engine and prevents malfunctions and other undesirable behavior. The apparatus of the invention is usable for any type of motor vehicle and using any type of motive power. Preferably however, the invention is used with vehicles employing internal combustion engines as motive power. The engine may receive its fuel-air mixture from a carburetor or from a mechanical or electronic fuel injection system. In a carburetor-equipped engine, the idle fuel supply may be provided by engaging an idle shut-off nozzle which is present in approximately eight percent of all modern vehicles. If the engine is equipped with a fuel injection system, such a system is capable of being engaged in a variety of ways that would interrupt the fuel supply at idle. However, the invention provides not only for engine stoppage during prolonged stops of the vehicle and restarts whenever the vehicle can move again, but it also provides for fuel shut-off during engine braking, sometimes called engine overrunning (i.e., a condition in which the engine operates at relatively high speed with a closed throttle). Furthermore, the invention provides for shutting off the vehicle lights and other electrical consumers. After a stoppage, the engine is restarted automatically by actuation of the gas pedal and/or the clutch pedal without any other action by the driver. Furthermore, the engine starting process is limited so as to prevent excessive wear and tear.

The engine is stopped according to the invention by the controller 1 which energizes output lines 2 and 3, which respectively actuate relays 4 and 5. The relay contacts 4a engage suitable fuel management systems of the engine and cause an interruption of fuel supply, while the relay contacts 5a are used to interrupt the ignition of the engine. A power supply line 6 provides electric power for the relay via a switch 7 which is under operator control. The operation of the switch 7 permits the operator to defeat the operation of the automatic system.

An output line 4' of the controller 1 goes to a third relay 8 having contacts 8a which are used to restart the engine, while still further output lines 9a, 9b, 9c engage associated relays 10a, 10b, 10c which may serve, for example, to shut off the headlights, the rear window defrosters, etc.

The input transducers associated with the controller 1 include a vehicle speed sensor 11, embodied for example as a reed switch disposed in the vicinity of the speedometer shaft and generating a signal at the frequency of rotation of the speedometer cable. Such a signal is related to the vehicle speed after appropriate consideration of the tire diameter. A relatively sensitive vehicle speed signal is required so as to generate a usable signal when the vehicle speed is very low, substantially equivalent to vehicle stoppage. This minimum speed $v_u$ may, for example, be less than 3 km/h and such a speed must be detected so as to provide for timely initiation of motor stoppage but also to insure that the motor is not stopped at speeds which are under the intentional control of the driver. The transformation of the reed switch signal into an appropriate output signal will be described below in connection with FIG. 3. A second transducer is a switch 13, associated with the accelerator pedal, and so constructed as to be electrically closed when the gas pedal is released. A similar switch 14 is closed when the clutch pedal is fully depressed and is open otherwise. The presence of the clutch switch 14 prevents an unintentional starting of the engine when it is engaged in a gear; it initiates engine starting when the clutch pedal is fully depressed. A further purpose of the switch 14 is to prevent engine stoppage when the clutch pedal is depressed which might be desired at low vehicle speeds, for example during parking procedures.

The invention also makes use of an engine temperature sensor 12, preferably a temperature dependent resistor, i.e., a so-called NTC-resistor. Many present day vehicles and engines already use such NTC-resistors at points where the engine temperature is monitored, for example engines equipped with the so-called Jetronic fuel injection. It is the purpose of the temperature sensor 12 to prevent automatic engine shut-off when the engine is not yet warmed up because repeated shut-off and restart of a cold engine would entail considerable wear and tear. On the other hand, an internal combustion engine at normal operating temperature is easily restarted, even repeatedly, without substantial loads on starter, clutches and gears, etc. The necessary electric power is also easily replenished when the engine is warm inasmuch as only a very short starting effort is required and the modern A.C. generators can replenish the battery charge very quickly.

The invention further provides for a battery charge monitor 15 which generates an enabling signal also applied to the controller 1 and may consist of a voltmeter 16 engaging a threshold switch 17. If the battery voltage is below a nominal value, for example 11.5 volt for a 12 volt battery, the threshold switch 17 no longer responds and its output signal can interrupt the automatic operation of the controller 1 until the battery 18 has been sufficiently recharged.

Figure 2:
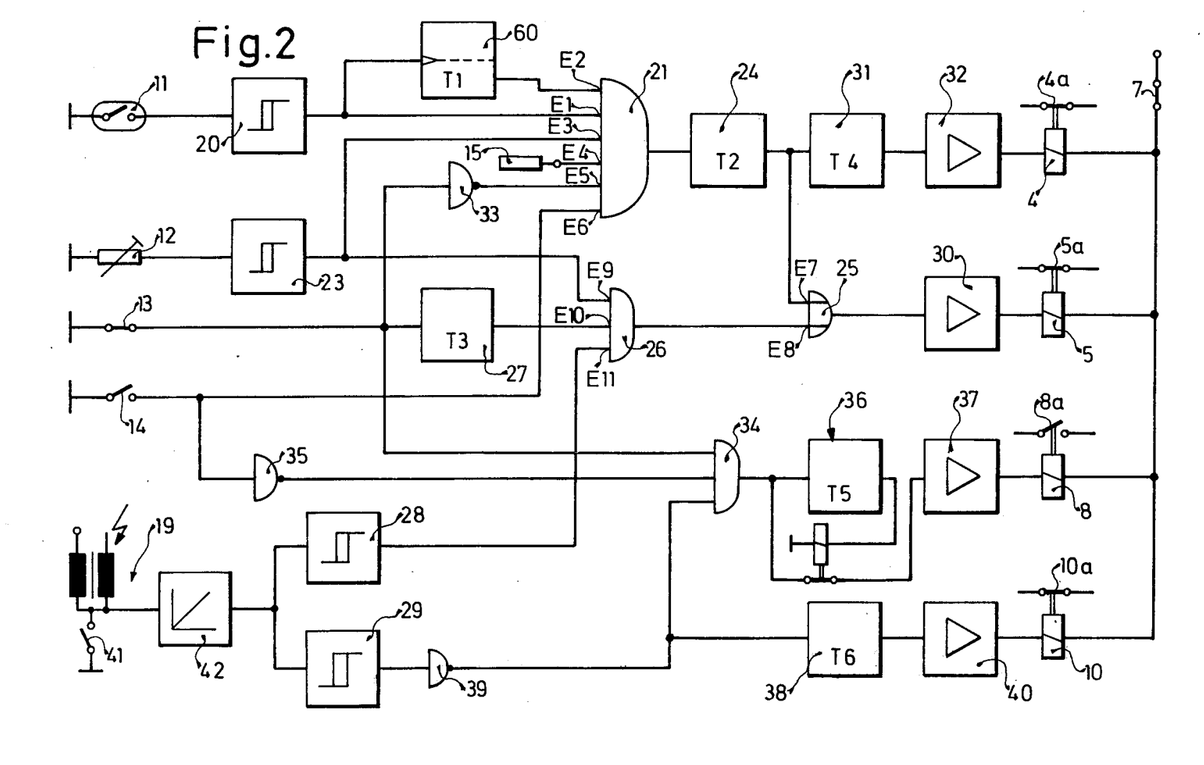
FIG. 2 is a more detailed block diagram of the apparatus of the invention.

The invention also makes use of a tacho-generator 19, associated for example with the breaker points 41 of the ignition (see FIG. 2) which generates an engine speed-related signal that may be used for fuel shut-off in engine braking operation as well as for monitoring the cranking speed of the engine so as to permit termination of the engine starting attempt when it exceeds a predetermined duration or when the engine reaches idling speed. The detailed block diagram of FIG. 2 shows that the control signals for the various relays at the output side of the apparatus are generated by logical gates of various types which change output states if and only if all the input signals have the identical status. The various gates can be of the type that responds to positive or negative going signals provided only that the overall logical response is in accord with the intended overall function. In the exemplary embodiment of FIG. 2, the reed switch 11 engages a threshold switch 20 which feeds one input E1 of a multiple AND gate 21. The other inputs of the AND gate 21 include an input E2 which receives the output of a first time delay circuit T1 that is triggered by the same signal applied to the input E1, an input E3 which receives an engine temperature signal from a temperature sensor 12 via a second threshold switch 23, an input E4 which receives a battery condition signal from a battery monitor device 15 (see FIG. 1), an input E5 receiving a signal related to the position of the gas pedal and an input E6 for receiving a signal related to the actuation of the clutch pedal from a switch 14. The output signal of the AND gate 21 is applied to a second time delay circuit 24 which sets a time delay T2. The output of the delay circuit 24 is applied to the input E7 of an OR gate 25 whose second input E8 receives the output signal of a further AND gate 26. One input E9 of the AND gate 26 receives the engine temperature signal while an input E10 receives the gas pedal signal from the switch 13 via a third time delay circuit 27 which applies a time delay of duration T3. The third input E11 of the AND gate 26 receives an engine speed signal generated by a tachometer 19 which feeds respective inputs of two threshold switches 28 and 29. The tachometer device 19 generates an output signal only when one of two conditions prevail, firstly, if the engine speed falls below a predetermined minimum speed, for example less than 300 rpm, i.e., a speed which is above the normal cranking speed but below the normal idle speed, or, secondly, if the engine speed exceeds an upper limit, for example greater than 1600 rpm, and the latter signal serves for engine-braking fuel shut-off. The output of the OR gate 25 serves to actuate the previously mentioned relay 5 which interrupts fuel supply, possibly after amplification in an amplifier 30. The output of the second delay circuit 24 is also applied to a further timing circuit 31 whence it goes to an optional output power circuit 32 and thence to the relay 4 which interrupts the primary ignition coil current and thereby prevents fuel ignition. In order to obtain the desired logic levels, the signal of the gas pedal switch 13 travels to the AND gate 21 via an inverter 33, the signal from the clutch pedal 14 goes to the AND gate 21 directly but goes to the AND gate 34 via a second inverter 35. The AND gate 34 serves to restart the engine by means of the relay 8 and for this purpose its output signal is applied via a delay circuit 36 having a delay time T5 to the relay 8 which actuates the engine starter, possibly after passage through a power output stage 37.

The additional relay 10 may serve for example to shut off the headlights and is engaged by the threshold switch 29 via a time delay circuit T6 from signals generated by the engine speed tachometer 19.

A number of conditions must be simultaneously satisfied in order that the relays 4, 5, 8 and 10, and possibly other associated relays, be energized. These conditions are listed below.

NECESSARY CONDITIONS FOR INTERRUPTING FUEL SUPPLY WITH A STOPPED OR NEAR-STOPPED VEHICLE (1) The vehicle speed v is below the minimum speed, for example $v < v_u = 3$ km/h, (2) The accelerator pedal is not actuated (gas pedal switch 13 closed), (3) The clutch pedal is not actuated (clutch pedal switch 14 open), (4) A period of time T1, for example 10 seconds, has elapsed since the previous crossing of the minimum speed $v_u$, (5) The engine temperature is equal or greater than 80° C., and (6) The vehicle battery has sufficient charge, i.e., the input E4 is a logical 1.

Under special circumstances, one or more of these conditions may be omitted but preferably all of these conditions are required and met so that the time delay circuit 24 applies its fuel shut-off signal after the expiration of the time T2 of approximately 2 seconds, thereby arresting the motor. The delay time of T2 approximately equal to 2 seconds serves to prevent an engine stoppage during gearshifting, for example for vehicle parking, in case the gas pedal and the clutch pedal are both released. The condition (3) prevents engine stoppage during short-term stops, for example in an intersection, because the clutch pedal remains depressed in such a case. This condition also insures that the driver can always prevent the engine stoppage by depressing the clutch pedal.

The entire circuit described in the present invention can be embodied advantageously in MOS technology, for example in the form of integrated circuits on a single chip. The gates and timing circuits may be embodied in COSMOS technology.

Suitable wiring diagrams for the timing circuits will be discussed in detail in connection with FIGS. 5a–6b. The condition (4) insures that, when the driver is forced to move his vehicle repeatedly for short distances, for example in bumper-to-bumper traffic, the engine will not be stopped on each such occasion. It is a feature of the present invention that the output signal for the relay 5 resulting in fuel shut-off can also be used for terminating fuel delivery during engine braking as well as during a vehicle stoppage. For this reason, the gate 25 is an OR gate which responds either to the demand "interrupt fuel during engine braking" or to an output signal from the AND gate 26. The conditions resulting in fuel shut-off during engine braking are these:

(1) No gas pedal actuation during a given length of time T3 (approximately 1 second), (2) An engine speed greater than 1600 rpm, and (3) Engine temperature greater than 80° C.

It will be understood that the numerical values given above are given only by way of example and that other numerical values may apply to particular vehicle types, provided only that the overall purpose and function described by the invention is thereby achieved.

In addition to or as an alternative to interrupting the fuel supply, the ignition may be shut off and for this purpose the following conditions must obtain:

(1) The conditions relating to "fuel supply termination for a stopped or near-stopped vehicle" must be satisfied, and (2) After condition (1) is satisfied, a period of time T4 equal to approximately 1.5 seconds must have expired.

The purpose of the condition (2) is to shut off the ignition only somewhat later than the fuel supply so as to completely combust any fuel mixture present in the cylinders.

It will be appreciated that the vehicle operator must be enabled to continue his voyage at any time after an automatic engine stoppage and without substantial actions on his part. Normally, the driver will want to move his vehicle by depressing his clutch pedal, engaging a suitable gear and depressing his accelerator. The control status "start engine" is obtained when the following conditions are met.

(1) The accelerator pedal is actuated, (2) The clutch pedal is actuated, and (3) The engine speed is less than 300 rpm.

Under these conditions, the AND gate 34, acting via the delay circuit 36, actuates the starter for a period not exceeding e.g., 3 seconds, after which the delay circuit 36 shuts off the signal that energizes the starter relay. However, under normal conditions, the engine starting signal will be terminated by the threshold switch 29, which signals to the AND gate 34 that the instantaneous engine speed has exceeded 300 rpm. A delay of 3 seconds (T5) is normally sufficient for reliable engine starting in this "stop and go" operation. Condition (2), i.e., that the clutch pedal must be depressed, serves to insure that the engine is not restarted by unintentional depression of the gas pedal. Condition (3) insures that the starter is disengaged at an engine speed of 300 rpm unless stopped after a delay of e.g., 3 seconds. The set points of the threshold switches 28 and 29 are such that the switch 28 generates an output signal when the engine speed exceeds 1600 rpm while the threshold switch 29 supplies an output signal at an engine speed of 300 rpm. After inversion by the inverter 39, the signal from the threshold switch 29 is applied to the gate 34 and to the light shut-off mechanism while the output from the threshold switch 28 goes to input E11 of the AND gate 26 related to fuel shut-off. In the circuit illustrated, the output of the inverter 39 will be a logical "1" at engine speeds below 300 rpm which, when combined with the "1" signals from the accelerator pedal switch 13 and from the clutch pedal switch 14, will result in an output signal which actuates the starter relay 8. If the engine speed exceeds the preset value of, for example, 300 rpm, the starter relay is deenergized, due to the output of the inverter 39 then being a logical "1" which also deenergizes the light relay 10, thereby closing the contacts 10a and turning the lights back on.

The conditions which must be satisfied to shut off the vehicle lights are:

(1) Engine speed greater than 300 rpm, (2) A time delay of 1 second must have elapsed (T6).

The condition (2) insures that the vehicles lights are turned back on only after the starter has been released.

Figure 3:
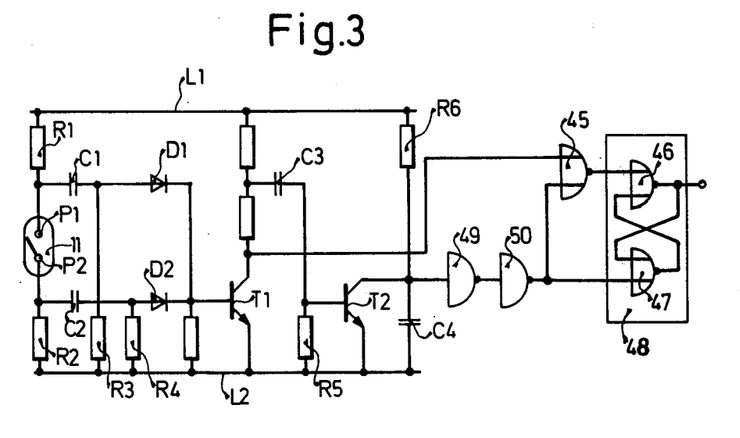
FIG. 3 is a detailed circuit diagram of a circuit for generating a low vehicle speed signal.
Figure 4:
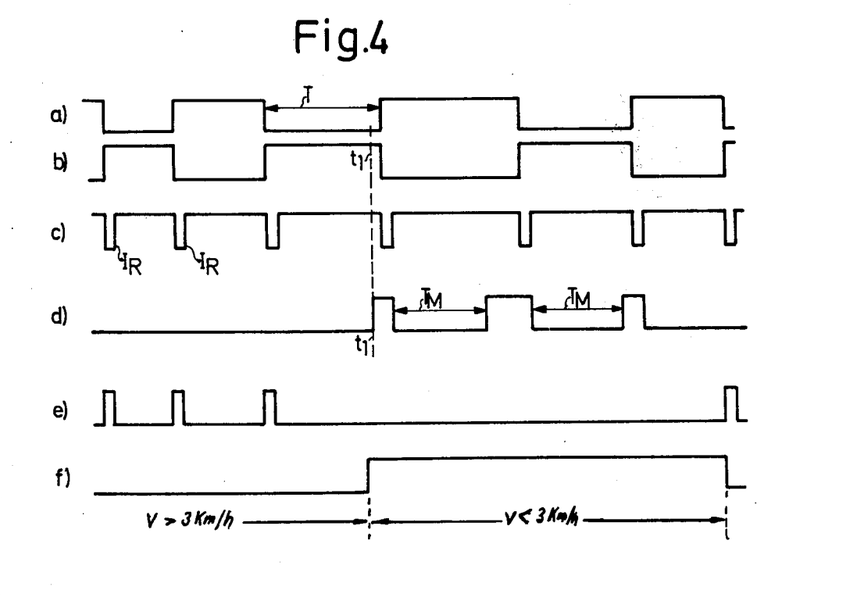
FIG. 4 is a set of diagrams illustrating various signals at points of the circuit of FIG. 3.

The input signals for the threshold switches 28 and 29 may be generated, for example, by a digital-to-analog converter 42 whose input is connected to the breaker points 41 of the ignition system and which generates an analog signal proportional to engine speed which is applied to the inputs of the threshold switches 28 and 29 which respond in the usual way when the input signal exceeds a preset internal threshold level. A detailed circuit for obtaining a signal related to the vehicle or wheel speed below the minimum speed $v_u$ which defines stoppage or near-stoppage of the vehicle, is illustrated in FIG. 3 and will be explained with the aid of the diagrams of FIG. 4. This circuit includes a reed switch 11 associated with a rotating part of the engine, for example the tachometer shaft, connected between power supply lines L1 and L2 of opposing polarity. When the reed switch 11 is periodically opened and closed, the contact points P1 and P2 carry the voltages illustrated in FIGS. 4a and 4b, respectively. The presence of differentiating RC members, including on the one hand, a capacitor C1, a resistor R3 and a diode D1 and, on the other hand, a capacitor C2, a resistor R4 and a diode D2, apply positive voltage pulses to the base of a transistor T1 causing the latter to conduct for short periods of time, thereby generating the negative collector pulses $I_R$ illustrated in FIG. 4c. These pulses are inverted by a NOR gate 45 which feeds one input of a bistable flip-flop 48 consisting of two NOR gates 46 and 47 (positive reset pulses illustrated in FIG. 4e) so that the output of the flip-flop 48 will be a logical "0" as long as the flip-flop 48 receives the aforementioned reset pulses. The output of the flip-flop 48 is illustrated in FIG. 4f as related to the prevailing vehicle speed. The presence of the reset pulses defines a condition in which the vehicle still travels faster than the minimum speed $v_u$.

The pulses generated at the collector of the transistor T1 pass through the RC member consisting of the capacitor C3 and the resistor R5 to the base of a further transistor T2 with which it constitutes a simplified monostable flip-flop. The collector of the transistor T2 is connected to ground via a capacitor C4 and to the positive line L1 via a resistor R6. Two inverting NAND gates 49 and 50 are connected in sequence behind the collector of the transistor T2. The output of the second NAND gate 50 goes firstly to a second input of the NOR gate 45 as well as to the set input of the flip-flop 48. The set pulses are shown in the diagram 4d and are generated if the period T of the transducer pulses illustrated in FIGS. 4a and 4b exceeds the unstable time constant of the simplified monostable flip-flop constituted by the transistor T2, the capacitor C3 and the resistor R5. Each positive-going edge of the collector voltage of the transistor T1, shown in FIG. 4c, renders the transistor T2 conducting and joins the input of the inverter 49 to ground. This condition prevails until the positive charge of the capacitor C3 decays via the resistor R5. If the next reset pulse $I_R$ (FIG. 4c) arrives in time, the transistor T2 remains in a conducting state so that the capacitor C4 prevents the potential at the output of the transistor T2 from rising rapidly enough to generate pulses for the inverters 49 and 50 during the time that the pulse $I_R$ exists. This condition may be met automatically by the threshold actuation voltage of COSMOS elements. However, the transistor T2 reverts to its normally closed condition at the time t1 if the period T of the transducer voltage becomes too large, i.e., if the vehicle speed falls below the minimum speed $v_u$ which, in the present exemplary embodiment, is approximately 3 km/h. In that case, the gates 49 and 50 generate the set pulses shown in FIG. 4d whose effect is to return the output of the flip-flop 48 to high potential (see FIG. 4f) and at the same time to prevent the generation of reset pulses for the reset input of the flip-flop 48. In that case, the output of the threshold switch 20 is a high potential for vehicle speeds less than 3 km/h so that the input E1 of the gate 21 becomes a logical "1." The time delay circuit 60 (T1) may be a monostable flip-flop, triggered by a logical "0" present at its input, i.e., when v is greater than $v_u$, and which then applies a logical "0" signal at the input E2 for a period of approximately 10 seconds (T1). In this way, the timing circuit 60 prevents a repeated actuation of the engine arrest system during "stop and go operation". The normal output signal of the monostable flip-flop 60 would be a logical "1."

Figure 5A:
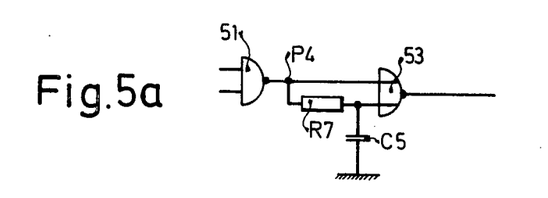
FIGS. 5a and 5b illustrates two variants of a time delay circuit.
Figure 5B:
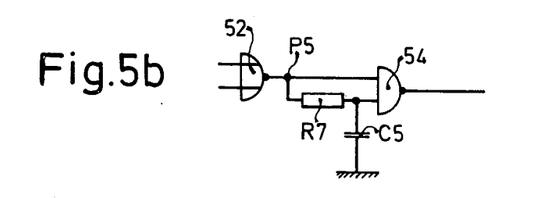
Figure 6A:
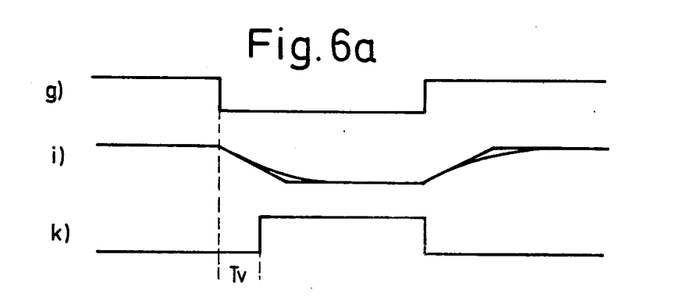
FIGS. 6a and 6b is a set of diagrams illustrating the time behavior of voltages at points of the circuit of FIG. 5.
Figure 6B:
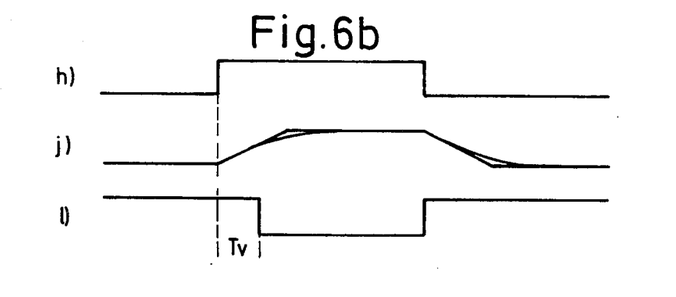

The time delay circuit shown schematically in FIG. 2 may be embodied, for example, by circuits illustrated in detail in FIGS. 5a and 5b, the former being for response to negative-going voltages and the latter for response to positive-going signals. The voltages whose effect is to be delayed occur at the circuit points P4 of FIG. 5a and P5 of FIG. 5b and may be present at the output of any suitable gate, for example a NAND gate 51 in the case of FIG. 5a or a NOR gate 52 in the case of FIG. 5b corresponding to the curves g and h in FIGS. 6a and 6b, respectively. These voltages are applied to one input of a NOR gate 53 or a NAND gate 54, respectively, as well as to the second input thereof via an integrating RC member consisting of a capacitor C5 and a resistor R7. As soon as these inputs reach the threshold voltages inherent in the MOS gates, the gates switch over and their outputs generate a signal which is delayed by the desired time $T_v$ as illustrated in FIGS. 6a k and 6b l. The curves i and j illustrate the voltages present at the output of the RC members.

The apparatus according to the invention can result in substantial fuel conservation as well as substantial reductions in exhaust emissions. In measurements performed on motor vehicles, the CO emission was reduced by 57% and the hydrocarbon emission by approximately 10%.

These data as well as fuel consumption data measured on a vehicle of the type Volkswagen 411E operated on the basis of the so-called "Europe" test are tabulated below. However, all measurements were made with a warmed-up engine because the apparatus of the invention does not respond when the engine temperature is too low.

| Vehicle equipment | Emission in g CO | Emission in g Hydrocarbon | Fuel consumption in g | Fuel savings % |
|---|---|---|---|---|
| Original equipment | 76.7 | 5.8 | 475 | 0 |
| With fuel shut-off during engine braking | 47.9 | 6.1 | 427 | 10 |
| With fuel shut-off during vehicle stoppage | 53.5 | 5.2 | 382 | 19.5 |
| With ignition shut-off during vehicle stoppage | 52.9 | 7.3 | 390 | 18 |
| With complete engine stop/start apparatus | 33.5 | 4.4 | 350 | 26 |

The foregoing relates to preferred exemplary embodiments of the invention, it being understood that other embodiments and variants thereof are possible within the spirit and scope of the invention.

What is claimed and desired to be secured by Letters Patent of the United States is:

1. A method for automatic control of the motor of a motor vehicle, comprising the steps of arresting the motor when each condition in a first set of conditions is determined to have been met, said first set of conditions including:

(A) the road speed of the vehicle falls below a minimum speed which is substantially equal to the lowest speed which the vehicle can have without stalling the motor when the drive line is engaged and being approximately 3 km/hour;
(B) the accelerator pedal is not depressed;
(C) the clutch pedal is not depressed; and
(D) a time period of selectable length T1 has elapsed since the previous passage of the vehicle speed through said minimum speed.

2. A method according to claim 1, wherein said set of conditions includes the further conditions:
(E) the motor temperature has reached a selectable minimum temperature of approximately 80° C.; and
(F) the charging condition of the battery has been determined to be adequate for effective motor starting.

3. A method according to claim 1, comprising the further step of arresting the motor when each condition in a second set of conditions is determined to have been met, said second set of conditions including:
(A) the accelerator pedal has not been depressed for a selectable period of time (T3) of approximately 1 second;
(B) the motor speed exceeds the idling speed; and
(C) the motor temperature lies above a selectable minimum temperature of approximately 80° C.

4. A method according to claim 1, wherein said step of arresting the motor includes terminating the fuel supply to the motor and shutting off the ignition when a selectable period of time (T4) of approximately 1.5 seconds has elapsed subsequent to the termination of fuel supply.

5. A method according to claim 1, comprising the further step of shutting off electricity-consuming vehicle components if the conditions in a second set of conditions are met, said second set of conditions including:
(A) the engine speed is substantially below the idling speed of the motor; and
(B) a selectable period of time (T6) of approximately 1 second has elapsed since the arrest of the motor.

6. A method according to claim 1, comprising the further step of restarting the motor if each condition in a second set of conditions is met, said second set of conditions including:
(A) the accelerator pedal is depressed;
(B) the clutch pedal is depressed; and
(C) the motor speed is below the cranking speed, i.e., below approximately 300 rpm.

7. An apparatus for the automatic arrest and starting of the motor in a motor vehicle, comprising:
a control circuit for generating at least one output signal which engages said motor resulting in its arrest, said control circuit having a plurality of control input contacts and logical combinatory circuits which produce said output signal only if all of said control input contacts exhibit predetermined states;
a plurality of condition sensors, one of said condition sensors detecting the vehicle speed of said motor vehicle and including a threshold switch comprising a monostable multivibrator, said threshold switch generating an input signal for said control circuit when the vehicle speed falls below a selectable minimum speed of approximately 3 km/hour.

8. An apparatus according to claim 7, wherein said vehicle speed sensor includes a reed switch actuated by the speedometer shaft of the vehicle, and wherein said plurality of condition sensors includes an electrical switch which is closed when the accelerator pedal is released and a further electrical switch associated with the clutch pedal which is closed when the clutch pedal is fully depressed.

9. An apparatus according to claim 8, wherein said plurality of condition sensors further includes a temperature sensor and an engine speed sensor.

10. An apparatus according to claim 7, wherein said sensor for detecting the vehicle speed of said motor includes a reed switch 11 associated with the speedometer shaft of the engine, a power supply for applying a voltage to the contacts of said reed switch, said reed switch being connected through differentiating elements including capacitors and resistors and through rectifying diodes to the input of a switching transistor (T1), a conducting electrode of said switching transistor (T1) being connected to the input of a NOR gate (45) whose output is connected to the reset input of a bistable flip-flop (48), said transistor (T1) being further connected to the input of a monostable flip-flop including a second transistor (T2), whose output is connected to a second input of said NOR gate (45) and also to the set input of said flip-flop (48); whereby when the period of time between changes of the reed switch voltage exceeds the period which indicates the minimum vehicle speed, said monostable flip-flop causes a change in the output state of said bistable flip-flop (48).

11. An apparatus according to claim 10, wherein the output of said bistable flip-flop (48) is connected to the input of an AND gate (21) and via a time delay circuit (60) including a monostable multivibrator to a further input (E2) of said AND gate (21), further inputs of said AND gate (21) receiving a signal from an accelerator pedal switch (13) and a clutch pedal switch (14) as well as from a motor temperature sensor (12) and a further signal from a sensor indicating the charge condition of the vehicle battery.

12. An apparatus according to claim 11, further comprising threshold switches (20, 23, 28, 29) respectively disposed between said condition sensors and the inputs of said AND gate (21) and further AND gates (26, 34).

13. An apparatus according to claim 12, wherein the output of said AND gate (21) is connected through a further time delay circuit (24) to the input of an OR gate (25) whose output is used to energize a relay connected to the fuel supply system of the engine; whereby the fuel supply is interrupted.

14. An apparatus according to claim 13, wherein the output signal of the time delay circuit (24) is fed to a further time delay circuit (31) the output of which energizes an ignition interrupting relay (4).

15. An apparatus according to claim 13, comprising a further AND gate (26) whose inputs are connected to receive sensor signals related to engine temperature, accelerator pedal position and engine speed and whose output is connected to the input of said OR gate (25); whereby if the motor exceeds idling speed and the accelerator pedal is not depressed, the fuel supply to the engine is interrupted.

16. An apparatus according to claim 7, further comprising an AND gate (34) with multiple inputs, one of said inputs being connected to a sensor (13) for indicating the accelerator pedal position, a further sensor (14) for detecting the clutch pedal position and an engine speed sensor (19), the output of said AND gate (34) being used to actuate a relay (8) which is connected to the motor so as to restart the motor at motor speeds below approximately 300 rpm.

17. An apparatus according to claim 16, further comprising a time delay circuit (36) for interrupting motor restarting after the expiration of a selectable period of time (T5) of approximately 3 seconds.

18. An apparatus according to claim 17, further comprising a timing circuit (38) connected to said motor speed sensor (19) for actuating one or more relays (10) which energize accessory instruments of the vehicle.

19. An apparatus according to claim 7, further comprising time delay circuits for delaying the signals from said condition sensors to the inputs of said control circuit, said time delay circuits including logical gates (53,54) with multiple inputs, one input of said gates receiving directly the signal to be delayed and the other input of said gates receiving the signal via an integrating RC combination (C5, R7); whereby the inherent response threshold of said gates and the action of said RC element results in a delayed response of the output from said gates to changes in the input signal.

* * * * *